United States Patent
Deng et al.

(10) Patent No.: US 12,027,892 B2
(45) Date of Patent: Jul. 2, 2024

(54) BATTERY PACK CHARGING SYSTEM AND CHARGING METHOD THEREOF

(71) Applicant: Yantai Chungway New Energy Technology Co., Ltd., Yantai (CN)

(72) Inventors: Yi Deng, Yantai (CN); Lilei Zhang, Yantai (CN); Mingming Li, Yantai (CN); Chunli Wang, Yantai (CN); Yang Wang, Yantai (CN); Xiaotong Shi, Yantai (CN)

(73) Assignee: YANTAI CHUNGWAY NEW ENERGY TECHNOLOGY CO., LTD., Yantai (CN)

( * ) Notice: Subject to any disclaimer, the term of this patent is extended or adjusted under 35 U.S.C. 154(b) by 482 days.

(21) Appl. No.: 17/490,994

(22) Filed: Sep. 30, 2021

(65) Prior Publication Data
US 2022/0376516 A1  Nov. 24, 2022

(30) Foreign Application Priority Data

May 20, 2021  (CN) .......................... 202121093398.X
Jun. 24, 2021  (CN) .......................... 202110705172.9

(51) Int. Cl.
*H02J 7/00* (2006.01)
*H01M 10/46* (2006.01)

(52) U.S. Cl.
CPC ........... *H02J 7/0013* (2013.01); *H01M 10/46* (2013.01); *H02J 7/0045* (2013.01)

(58) Field of Classification Search
CPC ....... H02J 7/0013; H02J 7/0045; H01M 10/46
See application file for complete search history.

(56) References Cited

U.S. PATENT DOCUMENTS

| 3,614,987 A | 10/1971 | Bonne et al. |
| 2020/0328485 A1* | 10/2020 | Volkmann ............. H01M 10/63 |

FOREIGN PATENT DOCUMENTS

| CN | 211592267 U | 9/2020 |
| CN | 112996689 A | 6/2021 |
| CN | 214728222 U | 11/2021 |

OTHER PUBLICATIONS

USPTO, Office Action in U.S. Appl. No. 17/133,116, filed Jun. 22, 2022, 9 pages.

* cited by examiner

*Primary Examiner* — Robert Grant
(74) *Attorney, Agent, or Firm* — CHUANGWAY IP

(57) ABSTRACT

The present invention discloses a battery pack charging system, comprising battery packs and a charging cabinet, a nitrogen replacement device is arranged inside the charging cabinet, the charging cabinet provides charging and nitrogen filling for the battery packs, wherein: there is a gas-filling protective device arranged between the nitrogen replacement device and the battery packs, and the gas-filling protective device is used to regulate the gas-filling flow of nitrogen automatically. Also disclosed is a charging method of the battery pack charging system. Beneficial effects: Different from the existing battery pack forms of electric bicycles, the present invention provides a feasible technical support for the "shared power changing" of the existing electric bicycle battery packs; Secondly, on the basis of improving the battery pack of electric bicycles, a battery cupboard capable of charging and filling nitrogen into the battery pack at the same time is provided for the battery pack, thus fundamentally preventing the thermal runaway of the battery; Moreover, a new method is provided for filling nitrogen into the battery pack, avoiding the defects of using (Continued)

double solenoid valves and oxygen concentration sensors in the existing technologies.

12 Claims, 2 Drawing Sheets

BATTERY PACK CHARGING SYSTEM AND CHARGING METHOD THEREOF

TECHNICAL FIELD

The present invention relates to the field of electric bicycle battery pack charging technology, and specifically to a battery pack charging system and a charging method thereof.

BACKGROUND

Because of convenience, economy, and other characteristics, electric products, such as electric bicycles and the like, are becoming more and more popular for short distance travel, and their holding quantity has also increased dramatically. However, safety accidents caused by battery fires in electric bicycles and other electric products keep happening.

2019 is the year at which the era of new national standard has officially arrived. Since then, the whole market has also shifted from lead-acid batteries to lithium batteries. At the same time, the business mode of "power changing" has started to be mentioned. The mode of "separation of vehicle and electricity, shared power changing" provides a new chance for the development of the electric vehicle industry. "Separation of vehicle and electricity, shared power changing" means that a shared charging cabinet is provided so that when the battery of the electric vehicle is low, the battery pack of the electric vehicle can be detached and charged from the shared charging cabinet. However, the safety of the small detachable lithium-ion battery pack of the electric bicycle cannot be ignored. The battery pack of the current electric bicycles is only provided with a charging port, but there are no protective means such as a pressure relief valve, nitrogen-filling and the like for charging protection.

At present, the large battery packs used by electric vehicles are generally filled with nitrogen outside the battery packs in a sealed space to prevent the thermal runaway of the battery packs. The applicant has applied for a patent about filling nitrogen into the battery pack earlier, in which nitrogen is generated by a nitrogen replacement device; inlet pipes and outlet pipes are employed to realize the filling of nitrogen into the battery packs and the discharge of other gases (e.g., oxygen); solenoid valves are separately arranged on the inlet pipes and the outlet pipes to control the on-off of the inlet gas and the outlet gas. In the actual gas-filling operation of the prior application, the battery packs are provided with oxygen concentration sensors to detect the oxygen content in the battery packs, and the switches of the solenoid valves are controlled sequentially, ultimately achieving the requirement of low oxygen in each battery pack. However, this technology can only fill nitrogen into one battery pack each time, so the gas-filling takes long time and the gas-filling efficiency is low. Moreover, the solenoid valves for vehicles are expensive, thus increasing the cost of gas-filling.

The working principle of filling nitrogen into the battery pack is as below: an oxygen concentration sensor is used to detect the real-time concentration of oxygen within the battery pack; when oxygen within the battery pack is detected to exceed the limit, the BMS system of the battery pack sounds an alarm, then a staff will fill nitrogen in time to discharge excessive oxygen in the battery pack, thereby ensuring the safety of the battery pack of the electric vehicle. However, the oxygen concentration sensor is expensive and has a short service life, so it cannot offer an early warning function once the failure occurs. In addition, after seal-capping of the battery pack, the replacement of the oxygen concentration sensor is also laborious.

SUMMARY

To overcome the defects of the prior art, the present invention provides a battery pack charging system, comprising a battery pack provided with a pressure relief valve, a nitrogen inlet port, a charging socket, a BMS system and a detector, which is applied for electric bicycles; a battery cupboard provided with a nitrogen replacement device, a charging unit and a charging chamber in it, where the nitrogen replacement device and the charging unit charge and fill nitrogen for the battery pack in the charging chamber; and a gas-filling protective device arranged between the battery pack and the nitrogen replacement device, which is used to regulate the gas-filling flow of nitrogen automatically. Also provided is a charging method of the battery pack charging system, which employs a special innovative gas-filling method to replace the gas-filling mode on the basis of detection by the oxygen concentration sensor in the existing technology. Firstly, different from the existing battery pack forms of electric bicycles, the present invention provides a feasible technical support for the "shared power changing" of the existing electric bicycle battery packs; Secondly, on the basis of improving the battery pack of electric bicycles, a battery cupboard capable of charging and filling nitrogen into the battery pack at the same time is provided for the battery pack, thus fundamentally preventing the thermal runaway of the battery; Moreover, a new method is provided for filling nitrogen into the battery pack, avoiding the defects of using double solenoid valves and oxygen concentration sensors in the existing technologies.

The objects of the present invention are achieved by the following technical measures: A battery pack charging system, comprising a battery pack and a charging cabinet, a nitrogen replacement device is arranged inside the charging cabinet, the charging cabinet provides charging and nitrogen filling for the battery pack, there is a gas-filling protective device arranged between the nitrogen replacement device and the battery pack, and the gas-filling protective device is used to regulate the gas-filling flow of nitrogen automatically.

Furthermore, the gas-filling protective device comprises a controller, flow regulating valves and a gas conveying pipeline, the nitrogen replacement device is connected to an inlet end of the gas conveying pipeline through a solenoid valve, the gas conveying pipeline is provided with several branches at its outlet end, the several branches are connected to several battery packs separately through flow regulating valves and correspond to the battery packs one by one; a detector is arranged inside each of the battery packs, which is used to detect the information of gas in the battery packs, and the controller is electrically connected to the solenoid valve, the detector and the flow regulating valve, respectively.

Furthermore, the flow regulating valve comprises a shell, a flow sensor, a motor, a valve plate and a rotating shaft, the shell is divided into a hold chamber and a gas channel, the hold chamber is a sealed cavity, the motor is arranged inside the hold chamber, the valve plate and the flow sensor are arranged inside the gas channel, the motor is connected to one end of the rotating shaft, the other end of the rotating shaft extends into the gas channel and is connected to the valve plate, and the flow sensor is used to detect the flow of gas within the gas channel and conveys the flow information to the detector.

Furthermore, the valve plate and the flow sensor are arranged sequentially along the gas flow direction.

Furthermore, the cross-section size of the valve plate matches with the cross-section size of the gas channel, and the rotation angle θ of the valve plate is 0°≤θ≤90°.

Furthermore, the detector comprises a sensor and a control module, the sensor is used to detect the information of gas in the battery pack and conveys the detection information to the controller, and the control module is used to control the flow regulating valve.

Furthermore, the charging cabinet comprises a cabinet body, a charging system and a nitrogen replacement device, the charging system and the nitrogen replacement device are arranged separately inside the cabinet body; the cabinet body is provided with a charging port and a nitrogen port separately on its side wall, the charging port is electrically connected to the charging system, the nitrogen port is connected to the nitrogen replacement device, the charging cabinet charges the battery packs through the charging ports, and the charging cabinet fills nitrogen into the battery packs through the nitrogen ports.

Furthermore, more than one sockets are provided on the side wall of the cabinet body, and one charging port and one nitrogen port are parallelly arranged in each single socket.

A charging method of the battery pack charging system, comprising the battery pack charging system, where the steps of the charging method are as below:

Step 1. Adding a pressure relief valve, a nitrogen inlet port, a charging socket, a BMS system and a detector on the battery pack of a two-wheeler or a three-wheeler;

Step 2. Placing the battery pack in the charging cabinet, connecting the nitrogen inlet port to the nitrogen port, and connecting the charging socket to the charging port;

Step 3. In the nitrogen replacement device of the charging cabinet, removing water from the compressed air through a dryer, removing large granular impurities in the air through a filter, and then producing a high concentration of nitrogen with a nitrogen generator, and the high concentration of nitrogen flows along the gas pipeline to the nitrogen port at the socket of each charging cabinet;

Step 4. Initiating the charging system to respectively charge and fill nitrogen to the battery packs within the charging cabinet at the same time; during the nitrogen filling process, the gas-filling protective device is operated as below: 1) presetting the control parameters: inputting the nitrogen pre-filling time Tm of the battery pack and the maximum differential pressure ΔP inside and outside the battery pack into the controller, initiating the nitrogen replacement device to start filling nitrogen into the battery pack, and at the same time starting recording the time t; 2) acquiring the external pressure Pw of the battery pack and the internal pressure Pn of the battery pack and calculating the differential pressure inside and outside the battery pack; if the differential pressure inside and outside the battery pack is less than ΔP, then acquiring the actual nitrogen-filling time Ts of the battery pack; 3) judging whether the actual nitrogen-filling time Ts of the battery pack is greater than or equals to the nitrogen pre-filling time Tm of the battery pack; if yes, terminating the nitrogen replacement device and stopping filling nitrogen into the battery pack, then the nitrogen filling process of the battery pack is completed for one time; otherwise, returning to 2).

Furthermore, in the 2), if the differential pressure inside and outside the battery pack is greater than or equals to ΔP, terminating the nitrogen replacement device and stopping filling nitrogen into the battery pack, acquiring the external pressure Pw of the battery pack and the internal pressure Pn of the battery pack again and calculating the differential pressure inside and outside the battery pack; if the differential pressure inside and outside the battery pack is greater than ΔP, then performing self-check on the system; otherwise, judging whether the differential pressure inside and outside the battery pack is less than ΔP, or, acquiring the duration Tt' of stopping filling nitrogen into the battery pack.

Furthermore, judging whether the differential pressure inside and outside the battery pack is less than ΔP; if yes, returning to 1), initiating the nitrogen replacement device again, and filling nitrogen into the battery pack again; otherwise, continually acquiring the external pressure Pw of the battery pack and the internal pressure Pn of the battery pack and judging the relationship between the differential pressure inside and outside the battery pack and ΔP.

Furthermore, when acquiring the duration Tt' of stopping filling nitrogen into the battery pack, the control parameters in 1) further comprise a gas-filling pause time Tz; judging whether Tt' is greater than or equals to Tz; if yes, returning to 1), initiating the nitrogen replacement device again, and filling nitrogen into the battery pack again; otherwise, continually acquiring the duration Tt' of stopping filling gas into the battery pack and judging the relationship between Tt' and Tz.

Furthermore, the control parameters in the 1) further comprise an interval nitrogen-filling time Tj; after stopping filling nitrogen into the battery pack in the 3), acquiring the duration Tt of stopping filling gas into the battery pack, and judging whether Tt is greater than or equals to Tj; if yes, returning to 1), initiating the nitrogen replacement device again, and filling nitrogen into the battery pack again; otherwise, continually acquiring the duration Tt of stopping filling gas into the battery pack and judging the relationship between Tt and Tj.

Compared to the prior art, the present invention has the following beneficial effects: firstly, different from the existing battery pack forms of electric bicycles, the present invention provides a feasible technical support for the "shared power changing" of the existing electric bicycle battery packs; Secondly, on the basis of improving the battery pack of electric bicycles, a battery cupboard capable of charging and filling nitrogen into the battery pack at the same time is provided for the battery pack, thus fundamentally preventing the thermal runaway of the battery pack; Moreover, a new method is provided for filling nitrogen into the battery pack, avoiding the defects of using double solenoid valves and oxygen concentration sensors in the existing technologies. In such a charging cabinet, multiple battery packs can be charged and/or filled with nitrogen one time, so the efficiency of charging and/or nitrogen filling is high, and the gas-filling is rapid. One solenoid valve controls the nitrogen on-off of the nitrogen replacement device, so the cost of the solenoid valve is low. There is no need for a sensor to detect the oxygen concentration, and the nitrogen filling into the battery pack can be regulated by a flow regulating valve as well as a new gas-filling method.

The present invention will be illustrated in detail in combination with the attached drawings and detailed description below.

Wherein, 1. Nitrogen replacement device, 2. Solenoid valve, 3. Gas conveying pipeline, 4. Battery pack, 5. Flow regulating valve, 6. Controller, 7. Detector, 8. Hold chamber, 9. Gas channel, 10. Motor, 11. Rotating shaft, 12. Valve plate, 13. Flow sensor, 14. Cabinet body, 15. Socket, 16. Charging port, 17. Nitrogen port, 18. Charging unit, 19. Pressure relief valve, 20. Nitrogen inlet port, 21. Charging socket, 22. BMS system, 23. Battery pack case.

DESCRIPTION OF THE EMBODIMENTS

Figure 1:
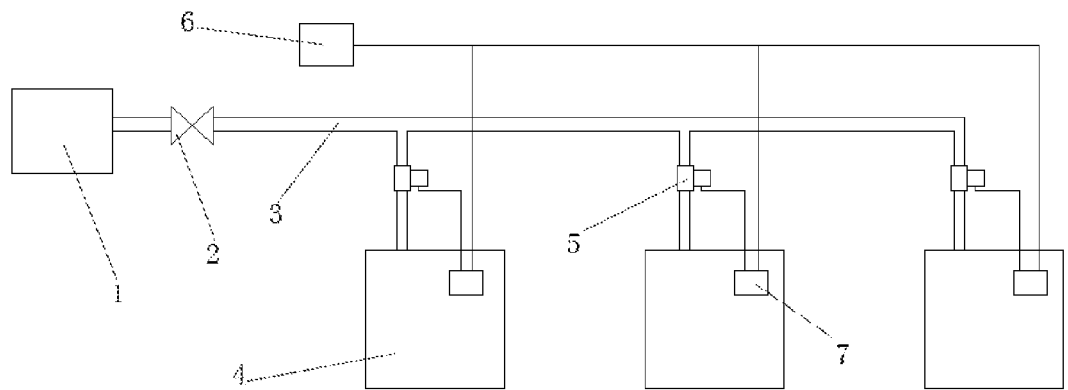
FIG. 1 is a schematic diagram of the connecting structure of the battery pack charging system according to the embodiments of the present invention.
Figure 2:
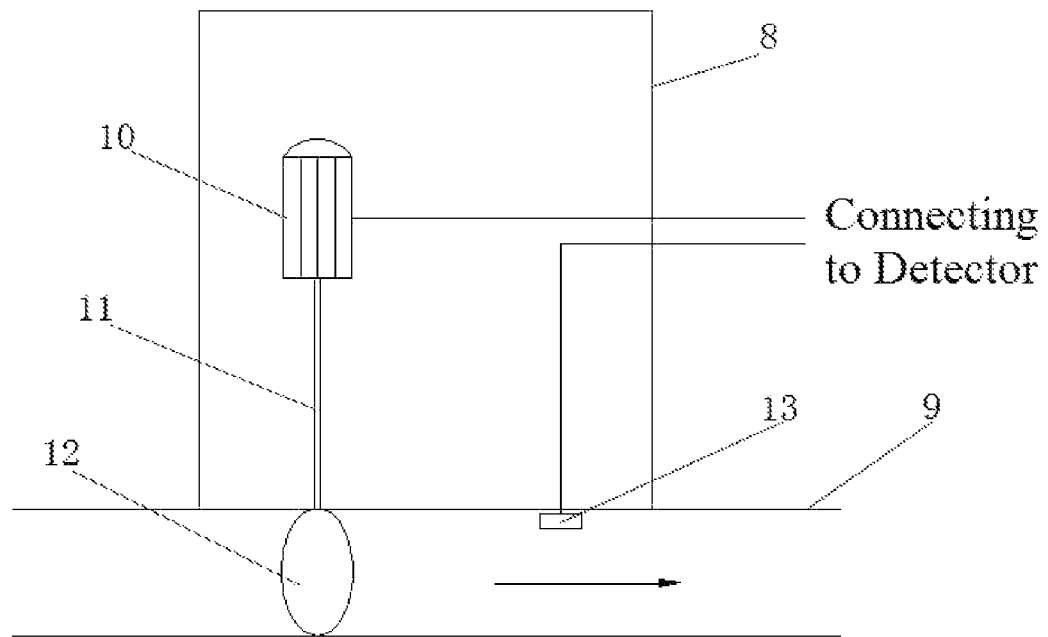
FIG. 2 is a structural schematic diagram of a flow regulating valve in the gas-filling protective device.
Figure 3:
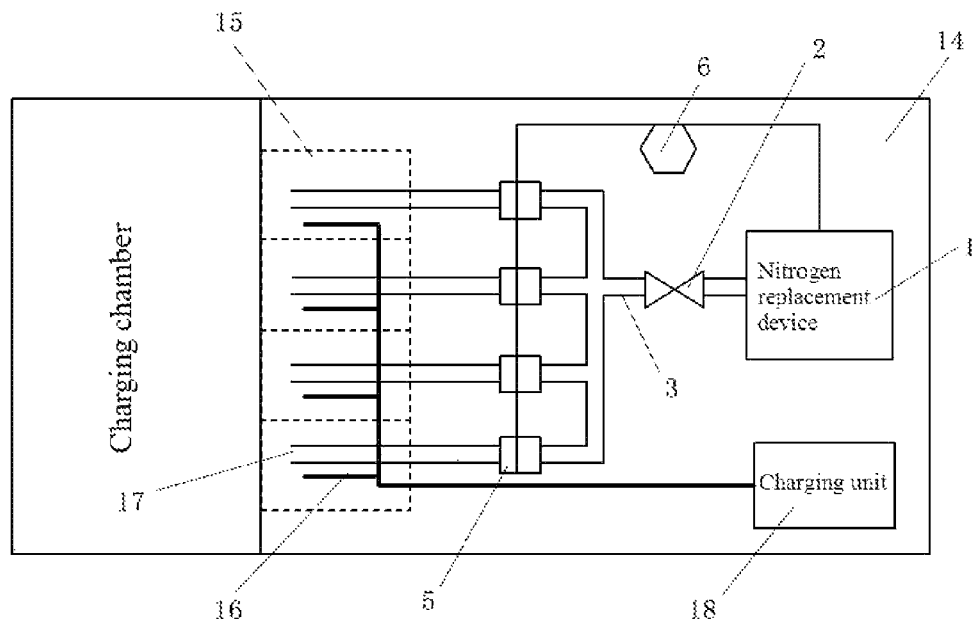
FIG. 3 is a structural schematic diagram of the charging cabinet.
Figure 4:
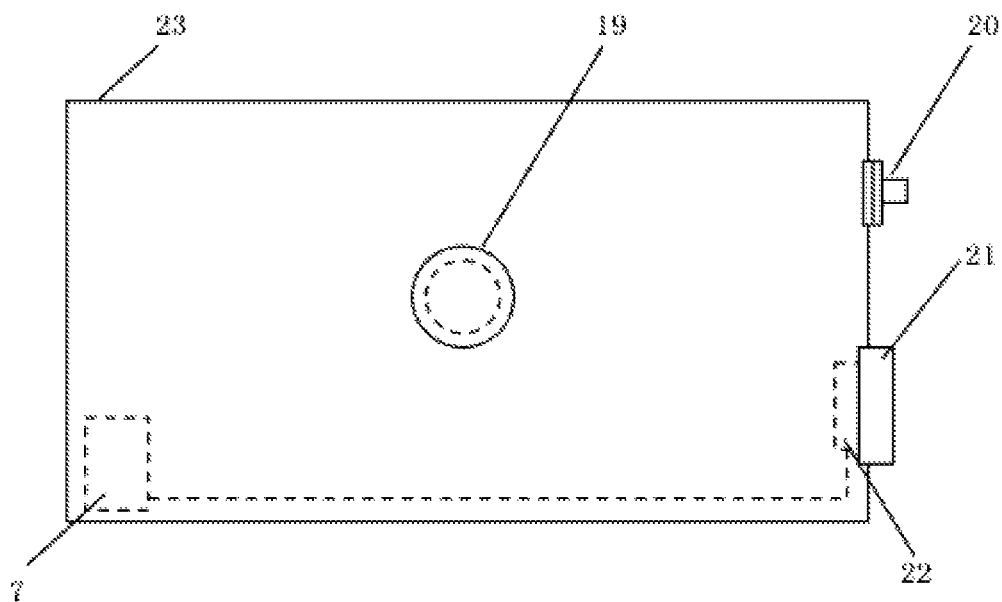
FIG. 4 is a structural schematic diagram of the battery pack.

As shown in FIGS. 1 to 4, a battery pack charging system, including battery packs 4 and a charging cabinet, a nitrogen replacement device 1 is arranged inside the charging cabinet, the charging cabinet provides charging and nitrogen filling for the battery packs 4, there is a gas-filling protective device arranged between the nitrogen replacement device 1 and the battery packs 4, and the gas-filling protective device is used to regulate the gas-filling flow of nitrogen automatically.

The gas-filling protective device includes a controller 6, flow regulating valves 5 and a gas conveying pipeline 3, the nitrogen replacement device 1 is connected to an inlet end of the gas conveying pipeline 3 through a solenoid valve 2, the gas conveying pipeline 3 is provided with several branches at its outlet end, the several branches are connected to several battery packs 4 separately through flow regulating valves 5 and correspond to the battery packs 4 one by one; a detector 7 is arranged inside each of the battery packs 4, which is used to detect the information of gas in the battery packs 4, and the controller 6 is electrically connected to the solenoid valve 2, the detectors 7 and the flow regulating valves 5, respectively. The detectors 7 convey the detection information to the controller 6, the controller 6 controls the flow regulating valves 5 after receiving the detection information, and the controller 6 is used to control the opening or closing of the solenoid valve 2 according to the detection information of the detectors 7. In particular, nitrogen is provided by the nitrogen replacement device 1. Of course, the nitrogen replacement device 1 may also be replaced with other incombustible gas generating devices, so as to supply the battery packs 4 with other incombustible gases, e.g., helium and the like; nitrogen goes into multiple battery packs 4 respectively through the gas conveying pipeline 3, and the flow of nitrogen entering each battery pack 4 is regulated with the flow regulating valve at the same time, so that nitrogen can be filled into each of the battery packs 4 uniformly within a short time, therefore the gas-filling time is short and the gas-filling efficiency is high; meanwhile, one solenoid valve 2 is arranged only at the inlet end of the gas conveying pipeline 3. By controlling the on-off of nitrogen gas with one solenoid valve 2, the number of the solenoid valve 2 is reduced, thus reducing the cost of gas-filling.

The flow regulating valve 5 includes a shell, a flow sensor 13, a motor 10, a valve plate 12 and a rotating shaft 11, wherein the shell is divided into a hold chamber 8 and a gas channel 9, the hold chamber 8 is a sealed cavity, the motor 10 is arranged inside the hold chamber 8, the valve plate 12 and the flow sensor 13 are arranged inside the gas channel 9, the motor 10 is connected to one end of the rotating shaft 11, the other end of the rotating shaft 11 extends into the gas channel 9 and is connected to the valve plate 12, and the flow sensor 13 is used to detect the flow of gas within the gas channel 9 and conveys the flow information to the detector 7. In particular, the flow sensor 13 is communicated with the detector 7, and the detector 7 is used to control the motor 10. The flow information is detected by the flow sensor 13 and conveyed to the detector 7, and then the detector 7 compares the detected flow information with a set value and issues an executive command. The executive command is used to control the rotation of the motor 10, thus driving the rotation of the rotating shaft 11 and further driving the rotation of the valve plate 12. The rotation of the valve plate 12 regulates the flow cross-section size of the fluid within the gas channel 9, thereby realizing the automatic regulation of the gas flow within the gas channel 9. In addition, the hold chamber 8 is separated from the gas channel 9, the motor 10 and circuits and the like are arranged inside the hold chamber 8 so as to be protected, thus reducing the impact of gas flow on the motor 10 and circuits, and also preventing the gas from flowing into the hold chamber 8 to produce vortex and cause the gas flow fluctuation, thereby improving the detection precision of the flow sensor 13.

The valve plate 12 and the flow sensor 13 are arranged sequentially along the gas flow direction. That is, the valve plate 12 is arranged near the inlet end of the gas channel 9, and the flow sensor 13 is arranged near the outlet end of the gas channel 9. The flow sensor 13 is arranged after the valve plate 12 so that the flow information detected by the flow sensor 13 is closer to the gas flow entering the battery packs 4, thereby further improving the detection precision of the flow sensor 13.

The cross-section size of the valve plate 12 matches with the cross-section size of the gas channel 9, and the rotation angle θ of the valve plate 12 is 0°≤θ≤90°. In particular, when θ is 0°, the valve plate 12 is perpendicular to the axial center line of the gas channel 9, so that the valve plate 12 seals the gas channel 9, then no gas is filled into the battery packs 4; when θ is 90°, the valve plate 12 is parallel to the axial center line of the gas channel 9, the flow rate in the gas channel 9 reaches the maximum, then gas is filled into the battery packs 4 at the maximal flow rate.

The detector 7 includes a sensor and a control module, where the sensor is used to detect the information of gas in each of the battery packs 4 and convey the detection information to the controller 6, and the control module is used to control the flow regulating valves 5. In particular, the control module is used to control the motor 10. The sensor conveys the detected gas information within the battery packs 4 to the controller 6, where it is compared with the set value, and then the controller 6 issues an executive command to realize the opening or closing of the solenoid valve 2. The on-off of gas in the gas conveying pipeline 3 is controlled by the controller 6, while the gas flow in the gas conveying pipeline 3 is regulated with the control module, thus achieving independent control without interference with each other.

The sensor is one or more of pressure sensors and concentration sensors. In particular, when it is a pressure sensor, it is used to detect the pressure within the battery pack 4; when the pressure within the battery pack 4 reaches the set value, the solenoid valve 2 is closed, the gas filling is stopped so as to avoid damages to the battery pack 4 caused by too high pressure. When it is a concentration sensor, it may be an oxygen concentration sensor or a nitrogen concentration sensor, which is used to detect the gas concentration changes within the battery pack 4. When the oxygen concentration is lower than the set value or the nitrogen concentration is higher than the set value, the solenoid valve 2 can be closed to stop gas filling. The sensor may also be a smoke sensor, a VOC sensor, a hydrogen sensor, a CO sensor, a temperature sensor, etc.

The control module is connected to the flow regulating valve 5 through the motor driving module. In particular, the driving module for the motor 10 is an L298N motor driving module, and the motor driving module is used to control the motor 10 to realize the forward rotation and reverse rotation of the motor 10, thereby turning up and turning down the flow.

The charging cabinet includes a charging chamber, a cabinet body 14, a charging unit 18 and a nitrogen replacement device 1, wherein the charging chamber and the cabinet body 14 are arranged adjacently side by side, the battery packs 4 are charged and filled with nitrogen inside the charging chamber, the charging unit 18 and the nitrogen replacement device 1 are arranged separately inside the cabinet body 14; the cabinet body 14 is provided with a charging port 16 and a nitrogen port 17 on its side wall, the charging port 16 is electrically connected to the charging unit 18, the nitrogen port 17 is connected to the nitrogen replacement device 1, the charging cabinet charges the battery packs 4 through the charging ports 16, and the charging cabinet fills nitrogen into the battery packs 4 through the nitrogen ports 17. Such a charging cabinet has the functions of charging the battery packs 4 and filling nitrogen into the battery packs 4 at the same time. In the existing technologies, the thermal runaway of the battery pack 4 of an electric bicycle is only protected during charging, that is, the battery pack 4 is cooled by nitrogen replacement in the charging cabinet during charging, or fire is extinguished with nitrogen. However, the safety protection of the battery pack 4 of an electric bicycle during use is lacked indeed. It is necessary to address the thermal runaway of the battery pack 4 both during charging and during use fundamentally, so as to playing a safety protection function during the use of the battery pack 4. The charging port 16 and the nitrogen port 17 can be operated simultaneously, or can be operated separately for nitrogen filling or charging. The charging port 16 is used when the power of the battery pack 4 is low. While the nitrogen port 17 can be used either during charging or during "power changing". After being used on an electric bicycle over a period of time, there may be some charge left in the battery pack 4, but the oxygen concentration within the battery pack 4 may increase with use. The oxygen concentration increases slowly in normal use, but when the oxygen concentration within the battery pack 4 increases to a certain proportion, it is dangerous and thermal runaway is more likely to occur. Therefore, after being used over a period of time, the battery pack 4 of the electric bicycle need to be supplemented with nitrogen in this charging cabinet, so that the battery pack 4 can be better protected from thermal runaway. Certainly, the battery pack 4 matched with the charging cabinet should be provided with a nitrogen charging port and a gas outlet and the like.

The charging port 16 and the nitrogen port 17 are arranged on the same side wall of the cabinet body 14. The charging port 16 and the nitrogen port 17 are arranged on the side near the charging chamber. The charging port 16 and the nitrogen port 17 may also be separately arranged on different side walls of the cabinet body 14. It is only convenient to be connected to the battery pack 4 when they are arranged on the same side wall of the cabinet body 14, and it can also reduce the difficulty in producing the cabinet body 14.

The side wall of the cabinet body 14 is provided with more than one sockets 15. Each single socket 15 is provided with a charging port 16 and a nitrogen port 17 arranged in parallel. The so-called socket 15 is a space arranged on the cabinet body 14 which is used to hold the charging port 16 and/or the nitrogen port 17. Such a design can realize that one socket 15 serves for one battery pack 4 correspondingly.

When there are multiple sockets 15 arranged on the side wall of the cabinet body 14, the charging ports 16 inside the multiple sockets 15 are in parallel connection, and the nitrogen ports 17 inside the multiple sockets 15 are in parallel connection. The design of parallel connection can ensure that a single charging port 16 or a single nitrogen port 17 can be used normally alone.

The nitrogen replacement device 1 includes an air compressor, a cold dryer, an air filter, a nitrogen generator, etc, where the air compressor, the cold dryer, the air filter and the nitrogen generator are connected in order, and then the outlet end of the nitrogen generator is connected to the gas-filling protective device through a solenoid valve 2. The nitrogen generator may employ a membrane nitrogen generator, a pressure swing adsorption nitrogen generator, etc.

A charging method of the battery pack charging system, comprising the battery pack charging system, the steps of the charging method are as below:

Step 1. Adding a pressure relief valve 19, a nitrogen inlet port 20, a charging socket 21, a BMS system 22 and a detector 7 on the battery pack 4 of a two-wheeler or a three-wheeler. The BMS system 22 controls the working mode of the battery pack, that is, control the charge or discharge of the battery pack. The BMS system 22 can also detect the voltage and current of the battery pack as well as control the detector. The pressure relief valve 19 is mounted on the top or one side of the battery pack. The pressure relief valve may be a waterproof and breathable film structure or a waterproof and breathable film structure having a unidirectional pressure-maintaining function. The battery pack 4 includes a battery pack case 23, the pressure relief valve 19, the nitrogen inlet port 20 and the charging socket 21 are respectively arranged on the lateral wall of the battery pack case 23, the BMS system 22 is arranged on the inside wall of the battery pack case 23, and the detector 7 is arranged inside the battery pack case 23. The nitrogen inlet port 20 and the charging socket 21 are arranged on the same side wall of the battery pack case 23.

Step 2. Placing the battery pack 4 in the charging chamber of the charging cabinet, connecting the nitrogen inlet port 20 to the nitrogen port 17, and connecting the charging socket 21 to the charging port;

Step 3. In the nitrogen replacement device 1 of the charging cabinet, removing water from the compressed air through a dryer, removing large granular impurities in the air through a filter, and then producing a high concentration of nitrogen with a nitrogen generator; the high concentration of nitrogen flows along the gas pipeline to the nitrogen port 17 at the socket of each charging cabinet;

Step 4. Initiating the charging system to respectively charge and fill nitrogen to the battery pack 4 within the charging cabinet at the same time; during the nitrogen filling process, the gas-filling protective device is operated as below: 1) presetting the control parameters: inputting the nitrogen pre-filling time Tm of the battery pack 4 and the maximum differential pressure ΔP inside and outside the battery pack 4 into the controller 6, initiating the nitrogen replacement device 1 to start filling nitrogen into the battery pack 4, and at the same time starting recording the time t. In particular, the pre-filling time Tm of different models of battery packs 4 is set according to the residual volumes of different models of battery packs 4, the concentration of protective gas and the flow of protective gas. Because when thermal runaway happens to the battery pack 4, bulges may appear first, and then the pressure relief valve 19 bursts to relieve the pressure, so the value of the maximum differential pressure ΔP inside and outside the battery pack 4 is determined by the differential pressure the battery pack 4 is under when bulges appear.

2) Acquiring the external pressure Pw of the battery pack and the internal pressure Pn of the battery pack and calculating the differential pressure inside and outside the battery pack; if the differential pressure inside and outside the battery pack is less than ΔP, then acquiring the actual nitrogen-filling time Ts of the battery pack. In particular, the pressure relief valve 19 of the battery pack 4 has a membrane structure with ventilation function. When protective gas is passed into the battery pack 4, the air in the battery pack 4 will be discharged out of the battery pack 4 through the pressure relief valve 19, so when the differential pressure inside and outside the battery pack 4 is less than ΔP, protective gas can be constantly filled into the battery pack 4 to achieve the replacement of air in the battery pack 4.

3) Judging whether the actual nitrogen-filling time Ts of the battery pack is greater than or equals to the nitrogen pre-filling time Tm of the battery pack; if yes, terminating the nitrogen replacement device 1 and stopping filling nitrogen into the battery pack, then the nitrogen filling process of the battery pack is completed for one time; otherwise, returning to 2). In particular, when the actual gas-filling time Ts of the battery pack 4 reaches Tm, it is indicated that the battery pack 4 has been filled with the protective gas, and the gas-filling process has finished for one time in the battery pack 4. The present invention proposes a method of filling protective gas into a lithium-ion battery pack 4 on the basis of pressure and time parameters, with no need of an oxygen concentration monitor, so the cost is low and the equipment has a long service life.

In the 2), if the differential pressure inside and outside the battery pack is greater than or equals to ΔP, terminating the nitrogen replacement device 1 and stopping filling nitrogen into the battery pack, acquiring the external pressure Pw of the battery pack and the internal pressure Pn of the battery pack again and calculating the differential pressure inside and outside the battery pack; if the differential pressure inside and outside the battery pack is greater than ΔP, then performing self-check on the system; otherwise, judging whether the differential pressure inside and outside the battery pack is less than ΔP, or, acquiring the duration Tt' of stopping filling nitrogen into the battery pack. In particular, when the differential pressure inside and outside the battery pack 4 reaches ΔP, the gas-filling device should be terminated immediately, and the filling of protective gas into the battery pack 4 should be stopped to avoid bulges of the battery pack 4 caused by excessive pressure. At this point, the external pressure Pw of the battery pack 4 and the internal pressure Pn of the battery pack 4 are acquired again and the differential pressure inside and outside the battery pack 4 is calculated. If the differential pressure inside and outside the battery pack 4 is greater than ΔP, it is indicated that the pressure detector or the controller 6 failures, and it is need to initiate the self-check on the system to detect the fault of the controller 6 and the pressure detector, and issue a fault early warning in time. If the differential pressure inside and outside the battery pack 4 equals to or is less than ΔP, it is indicated that the gas-filling flow is large, causing the internal pressure of the battery pack 4 to increase to ΔP, and it is need to pause the gas-filling and wait for the recovery of the pressure of the battery pack 4. The gas-filling status of the battery pack 4 is judged based on the changes of the pressure parameter, so as to ensure that there will be no bulges in the gas-filling process of the battery pack 4, thus ensuring the safety of the battery pack 4. In addition, the system faults of the detector 7 or the controller 6 can be found in time during the gas-filling process, and an early warning can be issued in time, thus improving the judgment precision.

Whether the differential pressure inside and outside the battery pack is less than ΔP is judged; if yes, returning to 1), initiating the nitrogen replacement device 1 again, and filling nitrogen into the battery pack again; otherwise, continually acquiring the external pressure Pw of the battery pack and the internal pressure Pn of the battery pack and judging the relationship between the differential pressure inside and outside the battery pack and ΔP. In particular, when gas-filling is stopped, the differential pressure inside and outside the battery pack 4 will decrease gradually due to the ventilation effect of the pressure relief valve 19; when the differential pressure inside and outside the battery pack 4 is lower than ΔP, the gas-filling device can be initiated again to fill gas into the battery pack 4 continually to complete the air replacement in the battery pack 4.

When acquiring the duration Tt' of stopping filling nitrogen into the battery pack, the control parameters in 1) further include a gas-filling pause time Tz; judging whether Tt' is greater than or equals to Tz; if yes, returning to 1), initiating the nitrogen replacement device 1 again, filling nitrogen into the battery pack again; otherwise, continually acquiring the duration Tt' of stopping filling nitrogen into the battery pack and judging the relationship between Tt' and Tz. In particular, due to different structures of the pressure relief valve 19, the air permeability of the pressure relief valve 19 is different; and due to different air tightness of different battery packs 4, the rates at which the internal pressure of the battery pack 4 decreases are also different, therefore, the gas-filling pause time Tz is determined according to the model of the battery pack 4 and the structure of the battery pack 4. When the battery pack 4 has good air tightness and the pressure relief valve 19 has poor air permeability, Tz can be set as a long time; while when the battery pack 4 has poor air tightness and the pressure relief valve 19 has good air permeability, Tz can be set as a short time. After stopping gas-filling for a period of Tz, the pressure in the battery pack 4 is reduced. When the differential pressure inside and outside the battery pack 4 is less than ΔP, the gas-filling device can be initiated again to continually fill gas into the battery pack 4 to complete the air replacement in the battery pack 4. In addition, if the gas-filling device is initiated again, when gas is filled again, the actual gas-filling time Ts of the battery pack 4 is the sum of the gas-filling time of the battery pack 4 before stopping gas-filling and the gas-filling time of the battery pack 4 after filling gas again.

The control parameters in the 1) further include an interval nitrogen-filling time Tj; after stopping filling nitrogen into the battery pack in the 3), acquiring the duration Tt of stopping filling gas into the battery pack, judging whether Tt is greater than or equals to Tj; if yes, returning to 1), initiating the nitrogen replacement device again, filling nitrogen into the battery pack again; otherwise, continually acquiring the duration Tt of stopping filling gas into the battery pack and judging the relationship between Tt and Tj. In particular, the interval gas-filling time Tj is determined according to the air tightness of the battery pack 4 and the air permeability of the pressure relief valve 19. When the battery pack 4 has good air tightness and the pressure relief valve 19 has poor air permeability, Tj can be set as a long time; while when the battery pack 4 has poor air tightness and the pressure relief valve 19 has good air permeability, Tj can be set as a short time. After stopping gas-filling, because of the air permeability of the pressure relief valve 19 and the battery pack 4, the concentration of protective gas in the battery pack 4 will decrease gradually, and the oxygen content in the battery pack 4 will increase gradually, thus increasing the risk of thermal runaway of the battery pack 4. A mode of intermittent gas-filling is employed so that the protective gas in the battery pack 4 is maintained in a high concentration range, thereby inhibiting the thermal runaway of the battery pack 4 and improving the safety of the battery pack 4.

It is apparent to persons skilled in the art that the present invention is not limited to the detail of the above exemplary embodiments, and the present invention can be realized in other concrete forms without deviating from the spirit or essential features of the present invention. Therefore, in any way, the embodiments should be regarded as exemplary, but not restrictive. The scope of the present invention is defined by the attached claims rather than by the above specification, so it is intended to encompass all variations falling within the meaning and scope of equivalent elements of the claims in the present invention. Any references in the claims shall not be deemed to limit the claims involved.

In addition, it should be understood that although the present specification is described in terms of embodiments, not each embodiment comprises only one independent technical solution. The specification is stated in this way only for the sake of clarity. Technical personnel skilled in the art should take the specification as a whole, and the technical solutions in various embodiments can also be combined properly to form other embodiments that can be understood by those skilled in the art.

What is claimed is:

1. A battery pack charging system, comprising a battery pack and a charging cabinet, a nitrogen replacement device is arranged inside the charging cabinet, the charging cabinet provides charging and nitrogen filling for the battery pack, wherein: there is a gas-filling protective device arranged between the nitrogen replacement device and the battery pack, and the gas-filling protective device is used to regulate the gas-filling flow of nitrogen automatically, and wherein the gas-filling protective device comprises a controller, flow regulating valves and a gas conveying pipeline, the nitrogen replacement device is connected to an inlet end of the gas conveying pipeline through a solenoid valve, the gas conveying pipeline is provided with several branches at its outlet end, the several branches are connected to several battery packs separately through flow regulating valves and correspond to the battery packs one by one; a detector is arranged inside each of the battery packs, which is used to detect the information of gas in the battery packs, and the controller is electrically connected to the solenoid valve, the detector and the flow regulating valves, respectively.

2. The battery pack charging system of claim 1, wherein: the flow regulating valve comprises a shell, a flow sensor, a motor, a valve plate and a rotating shaft, the shell is divided into a hold chamber and a gas channel, the hold chamber is a sealed cavity, the motor is arranged inside the hold chamber, the valve plate and the flow sensor are arranged inside the gas channel, the motor is connected to one end of the rotating shaft, the other end of the rotating shaft extends into the gas channel and is connected to the valve plate, and the flow sensor is used to detect the flow of gas within the gas channel and conveys the flow information to the detector.

3. The battery pack charging system of claim 2, wherein: the valve plate and the flow sensor are arranged sequentially along the gas flow direction.

4. The battery pack charging system of claim 2, wherein: the cross-section size of the valve plate matches with the cross-section size of the gas channel, and the rotation angle $\theta$ of the valve plate is $0°\leq\theta\leq90°$.

5. The battery pack charging system of claim 1, wherein: the detector comprises a sensor and a control module, the sensor is used to detect the information of gas in the battery packs and conveys the detection information to the controller, and the control module is used to control the flow regulating valve.

6. The battery pack charging system of claim 1, wherein: the charging cabinet comprises a cabinet body, a charging system and a nitrogen replacement device, the charging system and the nitrogen replacement device are arranged separately inside the cabinet body; the cabinet body is provided with a charging port and a nitrogen port separately on its side wall, the charging port is electrically connected to the charging system, the nitrogen port is connected to the nitrogen replacement device, the charging cabinet charges the battery packs through the charging ports, and the charging cabinet fills nitrogen into the battery packs through the nitrogen ports.

7. The battery pack charging system of claim 6, wherein: more than one sockets are provided on the side wall of the cabinet body, and one charging port and one nitrogen port are parallelly arranged in each single socket.

8. A charging method of a battery pack charging system comprising a battery pack, comprising the steps of:
Step 1. Adding a pressure relief valve, a nitrogen inlet port, a charging socket, a BMS system and a detector on the battery pack of a two-wheeler or a three-wheeler;
Step 2. Placing the battery pack in the charging cabinet, connecting the nitrogen inlet port to the nitrogen port, and connecting the charging socket to the charging port;
Step 3. In the nitrogen replacement device of the charging cabinet, removing water from the compressed air through a dryer, removing large granular impurities in the air through a filter, and then producing a high concentration of nitrogen with a nitrogen generator, and the high concentration of nitrogen flows along the gas pipeline to the nitrogen port at the socket of each charging cabinet;
Step 4. Initiating the charging system to respectively charge and fill nitrogen to the battery packs within the charging cabinet at the same time; during the nitrogen filling process, the gas-filling protective device is operated as below: 1) presetting the control parameters: inputting the nitrogen pre-filling time Tm of the battery pack and the maximum differential pressure $\Delta P$ inside and outside the battery pack into the controller, initiating the nitrogen replacement device to start filling nitrogen into the battery pack, and at the same time starting recording the time t; 2) acquiring the external pressure Pw of the battery pack and the internal pressure Pn of the battery pack and calculating the differential pressure inside and outside the battery pack; if the differential pressure inside and outside the battery pack is less than ΔP, then acquiring the actual nitrogen-filling time Ts of the battery pack; 3) judging whether the actual nitrogen-filling time Ts of the battery pack is greater than or equals to the nitrogen pre-filling time Tm of the battery pack; if yes, terminating the nitrogen replacement device and stopping filling nitrogen into the battery pack, then the nitrogen filling process of the battery pack is completed for one time; otherwise, returning to 2).

9. The charging method of the battery pack charging system of claim 8, wherein: in the 2), if the differential pressure inside and outside the battery pack is greater than or equals to ΔP, terminating the nitrogen replacement device and stopping filling nitrogen into the battery pack, acquiring the external pressure Pw of the battery pack and the internal pressure Pn of the battery pack again and calculating the differential pressure inside and outside the battery pack; if the differential pressure inside and outside the battery pack is greater than ΔP, then performing self-check on the system; otherwise, judging whether the differential pressure inside and outside the battery pack is less than ΔP, or, acquiring the duration Tt' of stopping filling nitrogen into the battery pack.

10. The charging method of the battery pack charging system of claim 9, wherein: judging whether the differential pressure inside and outside the battery pack is less than ΔP; if yes, returning to 1), initiating the nitrogen replacement device again, and filling nitrogen into the battery pack again; otherwise, continually acquiring the external pressure Pw of the battery pack and the internal pressure Pn of the battery pack and judging the relationship between the differential pressure inside and outside the battery pack and ΔP.

11. The charging method of the battery pack charging system of claim 9, wherein: when acquiring the duration Tt' of stopping filling nitrogen into the battery pack, the control parameters in 1) further comprise a gas-filling pause time Tz; judging whether Tt' is greater than or equals to Tz; if yes, returning to 1), initiating the nitrogen replacement device again, and filling nitrogen into the battery pack again; otherwise, continually acquiring the duration Tt' of stopping filling gas into the battery pack and judging the relationship between Tt' and Tz.

12. The charging method of the battery pack charging system of claim 8, wherein: the control parameters in the 1) further comprise an interval nitrogen-filling time Tj; after stopping filling nitrogen into the battery pack in the 3), acquiring the duration Tt of stopping filling gas into the battery pack, and judging whether Tt is greater than or equals to Tj; if yes, returning to 1), initiating the nitrogen replacement device again, and filling nitrogen into the battery pack again; otherwise, continually acquiring the duration Tt of stopping filling gas into the battery pack and judging the relationship between Tt and Tj.

* * * * *